(12) United States Patent
Haylett et al.

(10) Patent No.: US 10,667,537 B2
(45) Date of Patent: Jun. 2, 2020

(54) DAIRY POWDER

(71) Applicant: Koninklijke Douwe Egberts B.V., Utrecht (NL)

(72) Inventors: Andrew Haylett, Banbury (GB); Claire-Marie Den Boer, Banbury (GB); Joe Christopher Welsh, Banbury (GB); Fui Mei, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 6 days.

(21) Appl. No.: 15/756,551

(22) PCT Filed: Aug. 31, 2016

(86) PCT No.: PCT/EP2016/070544
§ 371 (c)(1),
(2) Date: Feb. 28, 2018

(87) PCT Pub. No.: WO2017/037131
PCT Pub. Date: Mar. 9, 2017

(65) Prior Publication Data
US 2018/0242606 A1    Aug. 30, 2018

(30) Foreign Application Priority Data

Sep. 1, 2015   (EA) .................................. 201591438
Sep. 1, 2015   (GB) .................................. 1515478.4

(51) Int. Cl.
*A23C 9/15* (2006.01)
*A23C 9/16* (2006.01)
(Continued)

(52) U.S. Cl.
CPC .................. *A23C 9/16* (2013.01); *A23C 1/00* (2013.01); *A23C 1/05* (2013.01); *A23C 1/16* (2013.01);
(Continued)

(58) Field of Classification Search
CPC ....... A23L 5/55; A23L 3/46; A23L 9/20–9/24; A23L 2/39; A23L 1/00; A23L 2/60;
(Continued)

(56) References Cited

U.S. PATENT DOCUMENTS 2,119,614 A * 6/1938 Webb ..................... A23C 21/08
                                                        426/583
2,399,195 A * 4/1946 Bodenheim .............. A23G 1/56
                                                        426/584
(Continued)

FOREIGN PATENT DOCUMENTS

EP         1613175         1/2006
EP         2058243         5/2009
(Continued)

OTHER PUBLICATIONS

Combined Search and Examination Report, dated Mar. 1, 2016 for United Kingdom Patent Application No. GB1515478.4 (6 pgs.).
(Continued)

*Primary Examiner* — Drew E Becker
(74) *Attorney, Agent, or Firm* — Fitch, Even, Tabin & Flannery LLP

(57) ABSTRACT

The present invention relates to a method for preparing a spray-dried dairy powder for forming a milk beverage when dissolved in a beverage medium, the method comprising: forming a dairy composition by: (i) adding a sugar composition to a dairy liquid; or (ii) blending a sugar solution with a dairy liquid, and spray-drying the dairy composition to form a spray-dried dairy powder comprising amorphous sugar, wherein the sugar composition or the sugar solution provides from 10 to 40 wt. % sugar by weight of the spray-dried dairy powder and wherein the sugar is selected from sucrose, lactose and a mixture thereof.

14 Claims, 3 Drawing Sheets

(51) Int. Cl.

| | | |
|---|---|---|
| *A23C 1/16* | (2006.01) | |
| *A23P 10/47* | (2016.01) | |
| *A23C 9/152* | (2006.01) | |
| *B65D 85/804* | (2006.01) | |
| *A23P 10/40* | (2016.01) | |
| *A23C 1/00* | (2006.01) | |
| *A23C 1/05* | (2006.01) | |
| *A23C 9/18* | (2006.01) | |
| *A23P 10/20* | (2016.01) | |
| *A23C 13/12* | (2006.01) | |
| *A23L 3/46* | (2006.01) | |
| *A23C 9/156* | (2006.01) | |
| *A23L 5/00* | (2016.01) | |
| *A23L 2/39* | (2006.01) | |
| *A23L 2/60* | (2006.01) | |

(52) U.S. Cl.
CPC ............ *A23C 9/152* (2013.01); *A23C 9/156* (2013.01); *A23C 9/1508* (2013.01); *A23C 9/1524* (2013.01); *A23C 9/18* (2013.01); *A23C 13/125* (2013.01); *A23L 3/46* (2013.01); *A23L 5/55* (2016.08); *A23P 10/20* (2016.08); *A23P 10/40* (2016.08); *A23P 10/47* (2016.08); *B65D 85/8043* (2013.01); *B65D 85/8046* (2013.01); *A23C 2210/30* (2013.01); *A23L 2/39* (2013.01); *A23L 2/60* (2013.01); *A23V 2002/00* (2013.01); *A23V 2200/238* (2013.01); *A23V 2250/5424* (2013.01); *A23V 2250/612* (2013.01); *A23V 2250/628* (2013.01); *A23V 2300/10* (2013.01)

(58) Field of Classification Search
CPC .. A23L 2/102; A23C 1/04–1/05; A23C 9/005; A23C 9/1508; A23C 9/156; A23C 9/16; A23C 13/00–13/08; A23C 13/125; A23C 2210/30; A23C 1/00; A23C 9/152; A23C 9/1524; A23C 1/16; A23C 9/18; A23V 2300/10; A23V 2250/628; A23V 2250/612; A23V 2250/5424; A23V 2002/00; A23V 2200/238; A23P 10/40; A23P 10/47; A23P 10/20; B65D 85/8043; B65D 85/8046

See application file for complete search history.

(56) References Cited

U.S. PATENT DOCUMENTS

| | | | | | |
|---|---|---|---|---|---|
| 2,504,542 | A | * | 4/1950 | Lebeson | A23G 3/42 127/42 |
| 2,621,128 | A | * | 12/1952 | Webb | A23C 9/156 426/580 |
| 2,659,676 | A | * | 11/1953 | Howard | A23C 11/04 426/72 |
| 3,013,881 | A | * | 12/1961 | Carlson | A23G 1/047 426/285 |
| 3,027,257 | A | * | 3/1962 | Shenkenberg | A23C 9/156 426/285 |
| 3,126,283 | A | * | 3/1964 | Noznick | A23C 9/005 426/658 |
| 3,218,174 | A | * | 11/1965 | Schubiger | A23G 1/042 426/660 |
| 3,231,385 | A | * | 1/1966 | Ziro | A23C 9/1526 426/71 |
| 3,244,528 | A | * | 4/1966 | Torr | A23C 9/156 426/580 |
| 3,262,788 | A | * | 7/1966 | Fenske | A23P 10/20 426/96 |
| 3,322,402 | A | * | 5/1967 | Anders | A23G 3/0205 366/148 |
| 3,357,839 | A | * | 12/1967 | Torr | A23C 9/156 426/580 |
| 3,357,840 | A | * | 12/1967 | Fisher | A23C 9/1516 426/565 |
| 3,543,696 | A | * | 12/1970 | Posdal | A23G 3/0205 426/519 |
| 3,826,854 | A | * | 7/1974 | Sanna et al. | A23G 3/346 426/572 |
| 4,056,640 | A | * | 11/1977 | Otto | A23G 3/32 426/573 |
| 4,871,573 | A | * | 10/1989 | Bohren | A23G 1/46 426/588 |
| 5,631,034 | A | * | 5/1997 | Trumbetas | A23G 3/343 426/302 |
| 5,637,344 | A | * | 6/1997 | Carpenter | A23G 1/12 426/631 |
| 6,071,428 | A | * | 6/2000 | Franks | A61K 47/26 124/29 |
| 6,548,099 | B1 | * | 4/2003 | Baker | A23C 9/00 426/588 |
| 6,635,303 | B1 | * | 10/2003 | Youcheff | A23C 1/04 426/34 |
| 6,685,981 | B1 | * | 2/2004 | Lipp | A23G 3/0215 366/144 |
| 8,617,635 | B2 | * | 12/2013 | Hanselmann | A23G 1/0026 426/631 |
| 2003/0084898 | A1 | * | 5/2003 | Beckett | A23G 1/56 127/58 |
| 2003/0124243 | A1 | * | 7/2003 | Cotten | A23G 3/0004 426/660 |
| 2006/0008576 | A1 | * | 1/2006 | Buck | A23G 1/30 426/660 |
| 2010/0028495 | A1 | | 2/2010 | Novak | |
| 2011/0070335 | A1 | * | 3/2011 | Brugger | A23C 9/16 426/61 |
| 2013/0209622 | A1 | | 8/2013 | Fountain | |
| 2015/0257402 | A1 | * | 9/2015 | Sipahioglu | A23C 1/04 426/588 |
| 2016/0058027 | A1 | * | 3/2016 | He | A23C 11/04 426/588 |
| 2017/0150731 | A1 | * | 6/2017 | Berrocal | A23C 11/04 |

FOREIGN PATENT DOCUMENTS

| | | |
|---|---|---|
| EP | 2123164 | 11/2009 |
| GB | 945977 | 1/1964 |
| GB | 1280051 | 7/1972 |
| GB | 2154422 | 9/1985 |
| GB | 2383515 | 7/2003 |
| IE | 84134 | 2/2005 |
| IE | 20030563 | 2/2005 |
| RU | 2540143 | 2/2015 |
| WO | 2006130698 | 12/2006 |
| WO | 2011039027 | 4/2011 |
| WO | 2014191404 | 12/2014 |
| WO | 2016008742 | 1/2016 |

OTHER PUBLICATIONS

Eurasian Patent Office Search Report, dated Dec. 7, 2015 for Eurasian Application No. 201591438, with English translation (2 pgs.).

International Search Report, dated Jan. 17, 2017 for International Application No. PCT/EP2016/070544 (5 pgs.).

Office Action, dated Jun. 30, 2017 for Eurasian Patent Application No. 201591438, with English translation (5 pgs.).

Office Action, dated Sep. 1, 2016 for Eurasian Patent Application No. 201591438, with English translation (7 pgs.).

* cited by examiner

DAIRY POWDER

CROSS REFERENCE TO RELATED APPLICATIONS

This application is a U.S. national phase application of International Application No. PCT/EP2016/070544, filed Aug. 31, 2016, which claims benefit from Great Britain Application GB1515478.4, filed Sep. 1, 2015, and Eurasian Application EA201591438, filed Sep. 1, 2015, which are each hereby incorporated herein by reference in their entirety.

FIELD

The present disclosure relates to a dairy powder. In particular, the disclosure relates to a method for preparing a spray-dried dairy powder for forming a milk beverage when dissolved in a beverage medium which has improved rehydration properties.

BACKGROUND

It is known to prepare milky beverages, such as coffee, hot chocolate, or simply milk itself, by reconstituting dairy powders. These dairy powders may be provided in sachets for manual dissolution and stirring, or in sealed capsules for use in a beverage preparation machine. It is known to provide soluble mixtures including sugar with a dairy powder to provide a desirable sweet taste in the resulting beverage. An additional powdered ingredient is, of course, required to provide a coffee or chocolate flavour as desired.

Conventional dairy powders typically have poor rehydration properties, that is to say, it is difficult to achieve good dissolution in a beverage medium. This is particularly problematic in low-flow, low-pressure (up to 3 bar) beverage preparation machines, where conventional powders can form wet lumps, "fish-eyes" (wet lumps with dry powder inside), or remain non-hydrated during the brew. This results in a high amount of residue left in the capsule, which is undesirable because the beverage in the cup has low solids and becomes watery with less flavour and texture. The foam and mouthfeel produced from such dairy powders is often unappealing to consumers.

WO 2006/130698 discloses chocolate confectionary products that include amorphous sugar. The replacement of crystalline sugar with amorphous sugar is said to achieve a cost reduction, a decrease in calories, a higher resistance to oil migration, and/or a higher resistance to water migration.

GB 1,280,051 relates to an oxidation resistant milk powder as an additive for chocolate. GB 1,280,051 discloses heating a mixture of sugar and milk to a temperature of between 100 and 140° C. for between 5 and 45 minutes in order to cause a Maillard reaction between the sugar and amino acids in the milk.

GB 2,154,422 relates to a drink composition in the form of a powder.

GB 2,383,515 relates to the use of a by-product acid whey to produce a cheaper milk powder without compromising the physical, chemical, and organoleptic properties of the milk powder products.

IE 84134 relates to a process for preparing a milk powder comprising a substantial lactose component.

EP 1,613,715 relates to a protein powder suitable for reconstitution to form a protein containing liquid, wherein the protein comprises about 3 to about 30% by weight pectin.

EP 2,123,164 relates to granulated dairy products. EP 2,123,164 discloses an alternative to spray drying for producing agglomerated powders.

US 2010/0028495 discloses a method and apparatus for forming beverages using a beverage cartridge containing a substantially soluble beverage precursor, such as a hot chocolate mix.

WO 2016/008742 relates to creamers for food products and methods for making the creamers in powder form.

WO 2014/191404 relates to a method and system for providing a heat treated liquid product.

SUMMARY AND DETAILED DESCRIPTION

There is a desire for a product that will mitigate at least some of the problems associated with the prior art and a method to produce the same, or at least to provide a commercially useful alternative thereto. In particular, there is a desire for a dairy powder that has improved rehydration properties relative to conventional powders.

According to a first aspect, the present disclosure provides a method for preparing a spray-dried dairy powder for forming a milk beverage when dissolved in a beverage medium, the method comprising:
  forming a dairy composition by:
    (i) adding a sugar composition to a dairy liquid; or
    (ii) blending a sugar solution with a dairy liquid, and
  spray-drying the dairy composition to form a spray-dried dairy powder comprising amorphous sugar,
  wherein the sugar composition or the sugar solution provides from 10 to 40 wt. % sugar by weight of the spray-dried dairy powder and wherein the sugar is selected from sucrose, lactose and a mixture thereof.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present disclosure relates to the preparation and manufacture of spray-dried dairy powder for forming a milk beverage when dissolved in a beverage medium. Dairy powders, including those of the present disclosure, comprise "milk solids". The term "milk solids" refers to the dried powder left after the water is removed from a liquid dairy product such as milk or cream. Dairy powders are popular since they have a longer shelf-life than liquid milk and do not need to be refrigerated, owing to their low moisture content. They are also less bulky than liquid milk and therefore have lower transportation costs.

By dissolving in a beverage medium it is meant bringing the powder into contact with a beverage medium, typically hot water, to form a solution of the powder in the beverage medium. As will be appreciated, the term "dissolving" as used herein includes forming a suspension of the powder in the beverage medium.

The dairy powders of the present disclosure are formed at least in part from a dairy liquid. Suitable dairy liquids include, for example, whole milk, skimmed milk or semi-skimmed milk and the like. Accordingly, the final product may be considered to be whole milk powders, semi-skimmed milk powders, skimmed milk powders, buttermilk powders, dry whey products and dry dairy blends, although the addition of sugar may prevent the official commercial use of such terms. As will be appreciated, the nature of the milk solids of these dairy powders will vary depending on their source, particularly in terms of their fat content. Preferably, the dairy liquid is a whole milk, resulting in a whole milk powder. As an alternative to using fresh milk, the aqueous suspension of milk solids may be reconstituted from milk powder. Whole milk powders typically have especially poor rehydration properties in aqueous media, since they have a higher fat content than skimmed milk powders and are therefore less dispersible or soluble.

Achieving good rehydration properties in a whole milk powder is therefore particularly challenging.

Given that milk has a low solids content (approximately 10 to 15%), it is preferred that milk is treated to provide an aqueous suspension having a higher solids content.

Typically the milk is creamed to standardise the fat content to about 3 to 4%, and is typically further concentrated by evaporation. Such processes are well known in the art. Preferably the aqueous suspension of milk solids has a total solids content of from 45 to 55 wt. %, more preferably from 47 to 51 wt. %, and most preferably about 48 wt. % prior to use. The dairy liquid is optionally pasteurized.

By a spray-dried dairy powder it is meant that the powder has been formed in a spray-drying step. That is to say, the powder is substantially homogeneous and is made up of substantially spherical particles. Spray-dried powders are usually free-flowing. Spray-dried powders are produced by drying a liquid or slurry with a hot gas, typically air.

Spray dryers, which are well known in the art, use a type of atomiser or spray nozzle to disperse the liquid or slurry into a controlled drop size spray. Advantageously, spray drying gives a consistent particle size distribution from powder to powder under the same conditions and is not as harsh as other drying techniques. Moreover, spray drying ensures that the constituent ingredients of the dairy powder are intimately mixed in the product. The powder, as a consequence of spray-drying may have a porous structure and will, in any event, have a substantially homogeneous distribution of the component ingredients throughout each particle. That is, by spray-dried powder it is intended that the amorphous sugar and dairy solids are present in each particle.

The method comprises a step of forming a dairy composition. The composition is for spray drying and will typically have a level of solids from 30 to 60%, preferably from 45 to 55%. The method comprises the addition of a sugar composition or a sugar solution to the dairy liquid. The spray-drying of the blend of sugar composition or sugar solution with the dairy liquid provides the final spray-dried product which comprises amorphous sugar.

According to a first alternative, a sugar composition is added to the dairy liquid. The sugar composition is preferably amorphous and is dissolved within the dairy liquid to facilitate spray-drying. The spray drying step facilitates the formation of amorphous sugars, from the dairy liquid sugar solution, in the finished product. It may be desirable to heat the dairy composition to ensure the complete dissolution of the sugar composition, such as to a temperature of from 40 to 80° C., more preferably from 50 to 70° C. and most preferably from 50 to 60° C.

According to a second alternative, a sugar solution is blended with the dairy liquid. That is, a predissolved amount of sugar is added to the dairy liquid before spray drying. This is advantageous because higher temperatures can be used to dissolve the sugar which would cause denaturisation of milk proteins if the dairy solution were heated to such temperatures. Accordingly, the sugar solution preferably has a temperature below 60° C. when blended with the dairy liquid. On the other hand, the use of a sugar solution does tend to reduce the level of solids in the blend and, consequently require the use of a more concentrated dairy liquid for suitable spray-drying solids levels. For comparable trial results, equivalent solids of sugar solution were used to avoid a "dilution" factor.

The spray-drying step forms a spray-dried dairy powder comprising amorphous sugar. The present inventors have found that adding sugar, preferably amorphous sugar, to the dairy liquid increases the amorphous sugar content of the dairy powder over and above that of the amorphous lactose presently found in dairy powders and improves the rehydration properties of the powder. This makes it possible to prepare a milk beverage having an improved foam and mouthfeel, and reduced residue, relative to beverages prepared from dairy powders containing crystalline sugar or a dry-mixed sugar. The spray-drying step may preferably further comprise a step of recycling fines into the drier to promote agglomeration and to ensure that the product has a narrower distribution of particle sizes (i.e. fines levels are reduced). Preferably the fines are recycled into the top of the chamber, by the spray nozzles.

The term "rehydration properties" as used herein refers to wettability, dispersibility and/or solubility in aqueous media. Wettability is the ability of a powder to absorb water after having been placed on the surface of a liquid. Dispersibility is the capacity of wet particles or aggregates to disperse upon contact with water. Solubility is the ability of a powder to rehydrate itself upon contact with water.

The blend may be homogenised prior to the spray-drying step. Homogenisation is well known in the art. Preferably the blend comprises fat globules having a mean diameter of less than 1 µm after the homogenisation step.

The sugar composition or the sugar solution provides from 10 to 40 wt. % sugar by weight of the spray-dried dairy powder and wherein the sugar is selected from sucrose, lactose and a mixture thereof. Amorphous sugar is sugar that lacks the long-range order that is characteristic of crystalline sugar. The present inventors have surprisingly found that by including these amounts of added amorphous sugar in the powder, the sugar interacts with the milk solids component of the powder to improve the rehydration properties of the milk solids and thus help them dissolve. Such an interaction is unexpected and is facilitated by the homogeneous, intimate mixture of amorphous sugar and milk powder afforded by the spray-drying. When the dairy powder is provided as part of a capsule, this reduces the amount of residue left in a capsule used in a low pressure brewing machine. Since more solids are dissolved in the beverage medium, the taste and texture of the beverage is improved.

Alternatively, less dry residue left in the capsule means that for a given strength of beverage, less powder needs to be included in the capsule. Accordingly, the method of the present invention may reduce the cost of producing a filled beverage capsule for providing a given beverage.

Preferably the sugar composition or the sugar solution provides 20 to 30 wt. % amorphous sugar, preferably from 22 to 28 wt. %, and most preferably from 24 to 26 wt. %. These amounts of amorphous sugar, which are in addition to any amorphous lactose already provided in the powder from lactose found in the dairy liquid, provide a milk powder with especially improved dissolution. The inclusion of sucrose can provide a sweetened spray dried dairy powder.

As noted above, the amorphous sugar of the present disclosure is selected from sucrose, lactose or a mixture thereof. The lactose may already be present from the dairy liquid, or may be added as a further addition before spray-drying. The level of lactose present in the dairy liquid itself will depend on any pre-treatment or concentration. Certain techniques such as evaporation, for example, will not reduce the levels of lactose. Ultrafiltration, on the other hand, will reduce the level of lactose.

According to one embodiment, the amorphous sugar present in the product consists essentially of sucrose. The present inventors have found that the rehydration ability of the dairy powder is greater when amorphous sucrose is included and this provides a desirable sweetened powder.

Preferably the method does not include a pasteurisation step other than the optional pasteurisation step described above in relation to the starting dairy liquid.

Preferably the method further comprises packaging the dairy powder, such as in a capsule as described herein.

Preferably, the spray-dried dairy powder of the present disclosure is in the form of an agglomerate, that is to say, the dairy powder is at least partially agglomerated during the spray drying step. Agglomerates can be formed by the adhesion (or accumulation) of primary particles. Agglomeration causes the particles to be more readily dispersible in water. Agglomerates have varying degrees of open spaces (voids), and are loosely bound, foam-like structures. They are formed by mechanical means in chamber spray dryers, tubes, or fluidised beds, usually in the presence of moisture. The preparation of agglomerates from primary particles is well known in the art.

Surprisingly it has also been found that the addition of sugar can help to reduce the level of fines in the finished product. It is known that reducing the level of fines in a dairy powder can aid the solubility of the dairy powder, this is seen in EP2483176B1 where the powder is sieved after spray drying to reduce the level of fines in the finished product, in order to improve solubility.

It has been found in the present invention that the addition of sugar acts to reduce the level of fines coming from the drier. Without wishing to be bound by theory it is hypothesised that this is due to the increased sugar content or the powder of the present invention altering the glass transition temperature of the powder inside the drier. This leads to greater agglomeration of fines as the powder is inherently stickier than ordinary dairy liquid powders. It is known that different drier designs, operating parameters and different set ups of fines re-circulation will cause differing degrees of agglomeration. However, it has been surprisingly found that, for a constant drier set-up, the addition of sucrose prior to drying reduces the volume percent of particles below 90 microns (fines) as measured by the HELOS laser diffraction system. It is assumed that at least part of the improvement in solubility is driven by the reduction in fines. This method has the benefit over EP2483176B1 in that no post processing step is required, thus simplifying the process.

Preferably the spray-dried dairy powder comprises less than 35 v. % of particles having a diameter of 90 microns or less, preferably less than 32.5 v. % and most preferably less than 30 v. %, even more preferably less than 25% and most preferably less than 20 v %. These particles are considered to be fines. The particle size distribution of the powder can be readily determined using the Helos Laser Diffraction system and the accompanying software can be used to determine the level of fines.

As will be appreciated, the particles which make up the final powder will have a range of sizes. The distribution can be affected by the spray-drying technique, as well as by additional sieving, milling, filtering and agglomeration steps that may optionally be performed.

Surprisingly it has also been found that the location of the point of fines recycle has a large impact on the level of fines in the finished product. It has been found that recycling the fines into the top of the drier, next to the spray nozzles in the main chamber, can lead to further reduced fines levels in the finished product compared to recycling the fines into the external fluidised bed, or the static fluidised bed, giving further re-hydration benefits.

The inventors have found that the combination of adding sugar prior to spray drying and recycling the fines into the top of the spray drier leads to a powder with advantageously low fines content and high solubility.

The particle size distribution (specifically a volume distribution density curve) of the dairy powder is determined using a laser diffraction technique on the dry particles. This technique can be used to determine a cumulative distribution. The cumulative distribution can be converted into a volume distribution density curve. Such techniques are well known in the art. The particle size distribution of the dairy powder can be measured using the laser diffraction software to determine the range of particle sizes and any peaks.

It has now become commonplace to characterise coffee grinds, dairy powders and the like using laser diffraction techniques. For example, a Helos dry system can be readily used to determine the characteristics of a coffee powder or a dairy powder or a blend. This provides values such as the X50, X10 and X90, as discussed herein. Unless otherwise stated, these values are radii which split fractions of the total particle volume distribution. Suitable measurement techniques include the use of Helos H3045 using an R6 lens and dispersion settings of 100% vibration, a 6 mm gap and a dispersion pressure of 0.5 bar.

The value of the X50 is the radius in a distribution by volume, where half of the particles have a greater volume and half of the particles have a lesser volume. The X10 is the radius in a distribution by volume, where 90% of the particles have a greater volume and 10% of the particles have a lesser volume. The X90 is the radius in a distribution by volume, where 10% of the particles have a greater volume and 90% of the particles have a lesser volume. These values can be obtained from the measurement software associated with the Helos dry system.

The values of X50 help to characterise the general properties of the powder. The values of X10 and X90 help to characterize the spread of the particle sizes. When the numbers are close together, the powder has a narrower range of particle sizes.

Preferably, the agglomerate has a particle size distribution having a X50 by volume of 130-190 μm.

Preferably, the particle size distribution of the agglomerate has a X10 of 40-60 um. Preferably, the particle size distribution of the agglomerate has a X90 of 350-420 um. A relatively narrow range of particle sizes for the dairy powder has been found to maximise the extraction yield obtained from the dairy powder and give a strong final beverage flavour.

The particle size depends mainly on the droplet size and solids concentration during spray-drying, which in turn depends on the spray conditions and the viscosity of the concentrate. In general, it has been found that the rehydration characteristics of the powder are improved at higher particle sizes and narrower particle size distributions.

Preferably, the spray-dried dairy powder has a tapped density of from 300 to 800 kg/m$^3$, preferably from 400 to 700 kg/m$^3$. By "tapped density" it is meant the density measured after a specified compaction process, typically involving vibration of the container. The tapped density of a powder is typically higher than its "bulk density" (also known as "poured density"), since once the container is disturbed, the powder particles will move and usually settle closer together, reducing the volume of interstitial air. The tapped density of an agglomerate is usually lower that of the corresponding non-agglomerated powder, since the higher grain size mean that agglomerates contain a greater volume of interstitial air. The preferred tapped densities of the present disclosure represent a compromise. An excessively high tapped density can reduce the rehydration ability of the powder, while an excessively low tapped density does not allow for sufficient filling of a beverage capsule.

Preferably the spray-dried dairy powder further comprises one or more flavourings, preferably selected from almond, amaretto, anise, apple, brandy, caramel, cider, cinnamon, cherry, chocolate, mint, cocoa, panna, crème de menthe, French vanilla, grape, hazelnut, soluble coffee, Irish cream, lemon, macadamia nut, orange, peach, peppermint, pistachio, strawberry, vanilla, wintergreen or a mixture of two or more thereof. Preferably the one or more flavourings are present in an amount of less than 5 wt %, preferably less than 1 wt %, of the spray-dried dairy powder.

The spray-dried dairy powder may additionally contain bulking agent such as maltodextrin in amounts of up to 30 wt %, preferably up to 20 wt %, and more preferably up to 10 wt % and minor amounts (less than 5 wt %, preferably less than 1 wt %) of other ingredients such as stabilisers, anti-caking agents, sweeteners, foaming agents, hydrocolloids, thickeners, free-flow agents. All of these beverage additives are well known in the art. Preferably the dairy powder has less than 10 wt %, more preferably less than 5 wt %, and most preferably less than 1 wt % of these additional ingredients.

Preferably, the spray-dried dairy powder has a moisture content of less than 5 wt. %, preferably less than 3 wt. %, and preferably at least 0.1 wt. %. As noted above, dairy powders (as opposed to liquids) provide a number of advantages in terms of shelf-life and reduced transportation costs. These advantages are especially pronounced at low moisture levels. Nevertheless, it is extremely difficult to remove all water from the dairy powder. In particular, there is usually a certain amount of very strongly bound water, which is relatively difficult to eliminate by dehydration and which is non-freezable.

According to an embodiment, the method includes the addition of crystalline sugar dry blended with the spray-dried dairy powder prepared as described above. Preferably, the composition has a total added sugar content of at most 50 wt. % by weight of the composition. The total sugar content includes both the total amorphous sugar of the spray-dried powder, together with the crystalline sugar. A relatively high total sugar content may be used when a sweeter taste is desired. The incorporation of crystalline sugar into the composition is straightforward since it can simply be blended with the spray-dried powder.

A preferred method for preparing a spray-dried dairy powder for forming a milk beverage when dissolved in a beverage medium, comprises:
 providing a pasteurised dairy liquid,
  mixing sugar with water at a temperature of from 40 to 80° C., preferably from 50 to 60° C., to form a sugar solution;
 blending the sugar solution at a temperature of below 60° C. with the dairy liquid, and
 spray-drying the dairy composition to form a spray-dried dairy powder comprising amorphous sugar,
wherein the sugar solution provides from 10 to 40 wt. % sucrose by weight of the spray-dried dairy powder, preferably 20 to 30 wt %.

This method is advantageous because the milk proteins are subjected to minimal heating and, since they are not denatured, give a fresh milky taste.

According to further aspects of the invention there are provided spray-dried powders which can be made according to the method described herein.

In particular, according to a further aspect there is provided a spray-dried dairy powder for forming a milk beverage when dissolved in a beverage medium, the powder comprising from 10 to 40 wt. % amorphous sucrose. Preferably the powder comprises amorphous lactose, and wherein the total amorphous sugar is from 30 to 80 wt % by weight of the spray-dried dairy powder.

According to a further aspect there is provided a spray-dried dairy powder for forming a milk beverage when dissolved in a beverage medium, the powder comprising from 30 to 80 wt. % amorphous sugar by weight of the spray-dried dairy powder,
 wherein the amorphous sugar comprises up to 40 wt % amorphous sucrose by weight of the spray-dried dairy powder, and
 wherein, when the powder comprises less than 50 wt. % amorphous sugar, the amorphous sugar comprises at least 10 wt % amorphous sucrose by weight of the spray-dried dairy powder Preferably the above powders comprise 100% amorphous sugar by weight of sugar in the spray-dried dairy powder. In some embodiments, the above powders comprise from 20 to 30 wt % amorphous sucrose by weight of the spray-dried dairy powder. In some embodiments, the amorphous sugar comprises amorphous lactose, and preferably consists of amorphous lactose.

According to a further aspect, the present disclosure provides a capsule for a beverage preparation machine containing the spray-dried dairy powder or the composition disclosed herein. Such capsules are well known in the art and include various pods, pads and cartridges as well as hoppers in vending machines. Preferably the capsule is a single-serve beverage container and is sealed before use. The present inventors have found that the excellent rehydration properties of the spray-dried dairy powder disclosed herein make it especially suitable for use in single-serve beverage preparation machines, where constraints on pressure and brew times demand powders having higher dispersability and solubility.

The capsule may be a filter paper pod, that is to say, a pod that comprises an upper sheet and a lower sheet sealed together around the periphery and enclosing the dairy powder, wherein each of the upper and lower sheets is formed of filter paper. The use of a filter paper container is very cost effective. Such pods are easy to fill and malleable and can conform to the brewing chamber to provide a suitably packed bed of dairy powder. For the avoidance of doubt, the brewing chamber is defined herein as the chamber formed around the pod in use. This will normally be formed by the pod support and the lid of the beverage preparation machine. Preferably, when the brewing chamber is closed on the filter pod the pod is further compressed. It is especially preferred that the pod does not include any rigid inserts, since these are expensive and unnecessary for the present composition.

Alternatively, the capsule may be a cartridge formed from substantially air- and water-impermeable materials, wherein the cartridge comprises an inlet for the introduction of an aqueous medium into the cartridge, an outlet for discharge of a beverage produced from the dairy powder, and a beverage flow path defined between the inlet and the outlet. Such cartridges are well known in the art and include, for example, those sold under the Tassimo® brand. In such on-demand systems, hot water is first injected into a powder-filled disc followed by water-soluble material exiting the disc through a narrow gap low pressure to make a desirable beverage.

The present inventors have found that conventional dairy powders typically leave a residue behind in the cartridge once the beverage has been dispensed. This residue is made up of wet lumps, "fish eyes" (wet lumps with dry powder inside) or unhydrated powder. The residue is undesirable because the beverage in the cup has low solids and becomes watery with less flavour and texture. By "dry residue" it is meant the total solids remaining in the capsule after the brew cycle divided by the total solids in the capsule before brewing. In other words, it is the mass of the "residue" once fully dried to remove any moisture present, for example in wet lumps or "fish eyes".

Conventional whole milk powders have been found to give a dry residue of 85%. By contrast, the dairy powders of the present disclosure typically give a dry residue of 20% or lower. This is for comparable testing with the same loading when dispensed from a cartridge using a low pressure preparation machine. The reduction in residue ensures that a beverage with full flavour and texture is obtained without wasted ingredients. As will be appreciated, the dairy powders of the present disclosure are especially advantageous in these low-flow, low-pressure applications, where it is challenging to maximise beverage extraction into the beverage medium.

According to a further aspect, the present disclosure provides the use of amorphous sugar in a milk powder to reduce the dry residue in a beverage capsule when the powder is reconstituted to form a milk beverage, particularly when using a low pressure (less than 3 Bar) beverage preparation machine.

Preferably the cartridge comprises an eductor. Eductors are well-known in the art, and serve to entrain air in the beverage to produce foam. By "eductor" it is meant a means for producing a jet of the beverage, wherein said means for producing the jet of the beverage comprises an aperture in the beverage flow path, at least one inlet for air and means for generating a pressure reduction of the jet of beverage. In use, air from the at least one air inlet is incorporated into the beverage as a plurality of small bubbles. Frothy milk-based foams are especially desired by consumers seeking authentic-looking cappuccino-style beverages and milk-shakes. Suitable cartridges for use in the present disclosure, and in particular a cartridge comprising an eductor, are described in detail in EP 2058243, which is incorporated herein by reference.

Preferably the fill weight of the spray-dried dairy powder or the composition in the capsule is from 4 to 25 g, more preferably from 6 to 15 g, still more preferably from 10 to 14 g and most preferably about 12.5 g. In this way a single desirable beverage can be made from each container. For a soft capsule such as a filter paper pod, the fill weight is preferably from 10 to 14 g. For a hard capsule (cartridge), the fill weight will typically be lower (from 4 to 10 g) since a higher pressure can be used when dispensing.

Preferably the dissolution ratio by weight of the spray-dried dairy powder to the beverage medium is from 1:5 to 1:15, more preferably from 1:7 to 1:12.

According to a further aspect, the present disclosure provides a package comprising the spray-dried dairy powder, the composition or the capsule disclosed herein.

According to a further aspect there is provided a method for the manufacture of a beverage capsule for the preparation of a sweetened dairy beverage, the method comprising:
forming a spray-dried dairy powder for forming a milk beverage when dissolved in a beverage medium, the method for forming the spray-dried dairy powder comprising:
forming a dairy composition by:
(i) adding a sugar composition to a dairy liquid; or
(ii) blending a sugar solution with a dairy liquid, and
spray-drying the dairy composition to form a spray-dried dairy powder comprising amorphous sugar,
wherein the sugar composition or the sugar solution provides from 10 to 40 wt. % sugar by weight of the spray-dried dairy powder and wherein the sugar is selected from sucrose, lactose and a mixture thereof, and
filling the spray-dried dairy powder into a capsule and sealing the capsule.

Preferably the sugar is sucrose.
Preferably the capsule has a dry residue of 20% or lower.
Preferably the capsule is a cartridge formed from substantially air- and water-impermeable materials as described above.

According to a further aspect, the present disclosure provides a method for dispensing a beverage from a beverage preparation machine, the method comprising:
introducing the capsule as disclosed herein into a beverage preparation machine; and
passing an aqueous medium through the capsule to dispense a beverage.

As will be appreciated, while these steps are intended to be sequential, there may be some overlap between the steps when the method is carried out in a continuous manner.

The aqueous medium will typically be water, although another prepared beverage may also be used, such as from another capsule. The medium is preferably heated, and may be heated to a temperature of from 60-95° C.

The beverage preferably has a volume of from 50 to 300 mL, more preferably from 100 to 250 mL. The beverage preferably has a total solids content provided by the spray-dried powder of from 5 to 20 wt %, preferably from 8% to 17%.

Preferably the capsule used in this method is the cartridge described above. In this embodiment, the aqueous medium is passed through the cartridge along the beverage flow path to produce a beverage. Preferably the aqueous medium is passed through the cartridge at a pressure of from 0.5 to 2.5 bar, more preferably from 1.0 to 2.0 bar. Alternatively or in addition, the aqueous medium may be passed through the container at a flow rate of from 3 to 7 mL/s, preferably from 4 to 6 mL/s, and most preferably about 5 mL/s. These pressures and flow rates are conventional. As explained above, the conditions employed in low-flow, low-pressure beverage preparation machines make the dissolution of milk solids challenging. The spray-dried dairy powder of the present disclosure is therefore especially suited to these applications.

Preferably, after the beverage is dispensed, the capsule has a dry residue of less than 25 wt. % based on the initial weight of the dairy powder in the capsule, preferably from 0 to 20 wt. %. "Dry residue" is defined above.

As discussed above, the dairy powders of the present disclosure have improved rehydration properties relative to conventional dairy powders, thereby decreasing the amount of dry residue in the capsule after the brew cycle.

According to a further aspect, the present disclosure provides a use of a spray-dried dairy powder or a composition as disclosed herein in a beverage capsule for use in a beverage preparation machine, to reduce a dry residue remaining in the capsule after passing an aqueous medium through the capsule to prepare the beverage.

FIGURES

Brief Description of the Figures

The present disclosure will be described in relation to the following non-limiting figures, in which:

FIG. 5 shows Step A of providing amorphous sugar, crystalline sugar or an aqueous sugar solution, Step B of providing an aqueous dairy suspension, Step C of mixing the aqueous dairy suspension with the sugar to form a blend, Step D of drying the blend to form a powder containing amorphous sugar, and optional Step E of packaging the powder.

EXAMPLES

The present disclosure will now be described in relation to the following non-limiting examples.

Example 1

Figure 1:
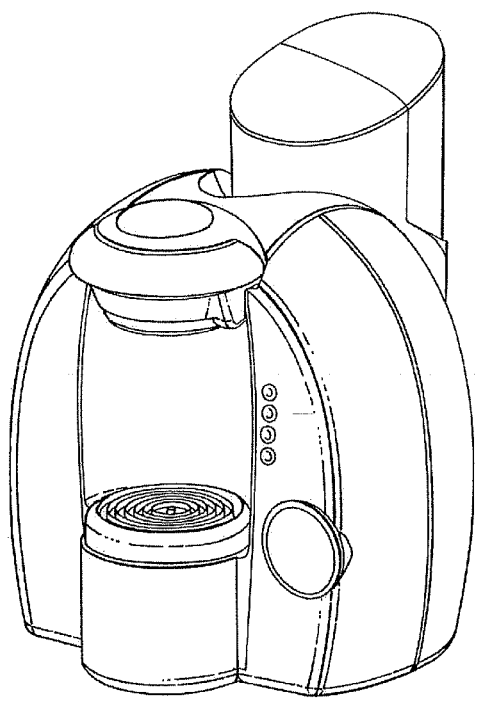
FIG. 1 shows an example of a beverage preparation machine.
Figure 2:
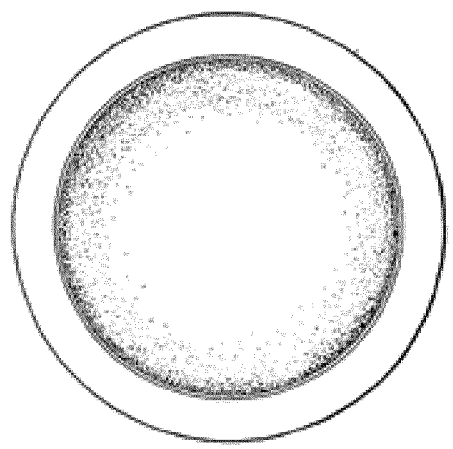
FIG. 2 shows a filter paper pod for a beverage preparation machine.
Figure 3:
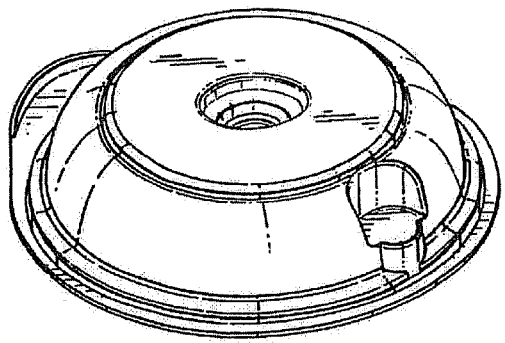
FIG. 3 shows a cartridge for a beverage preparation machine.
Figure 4:
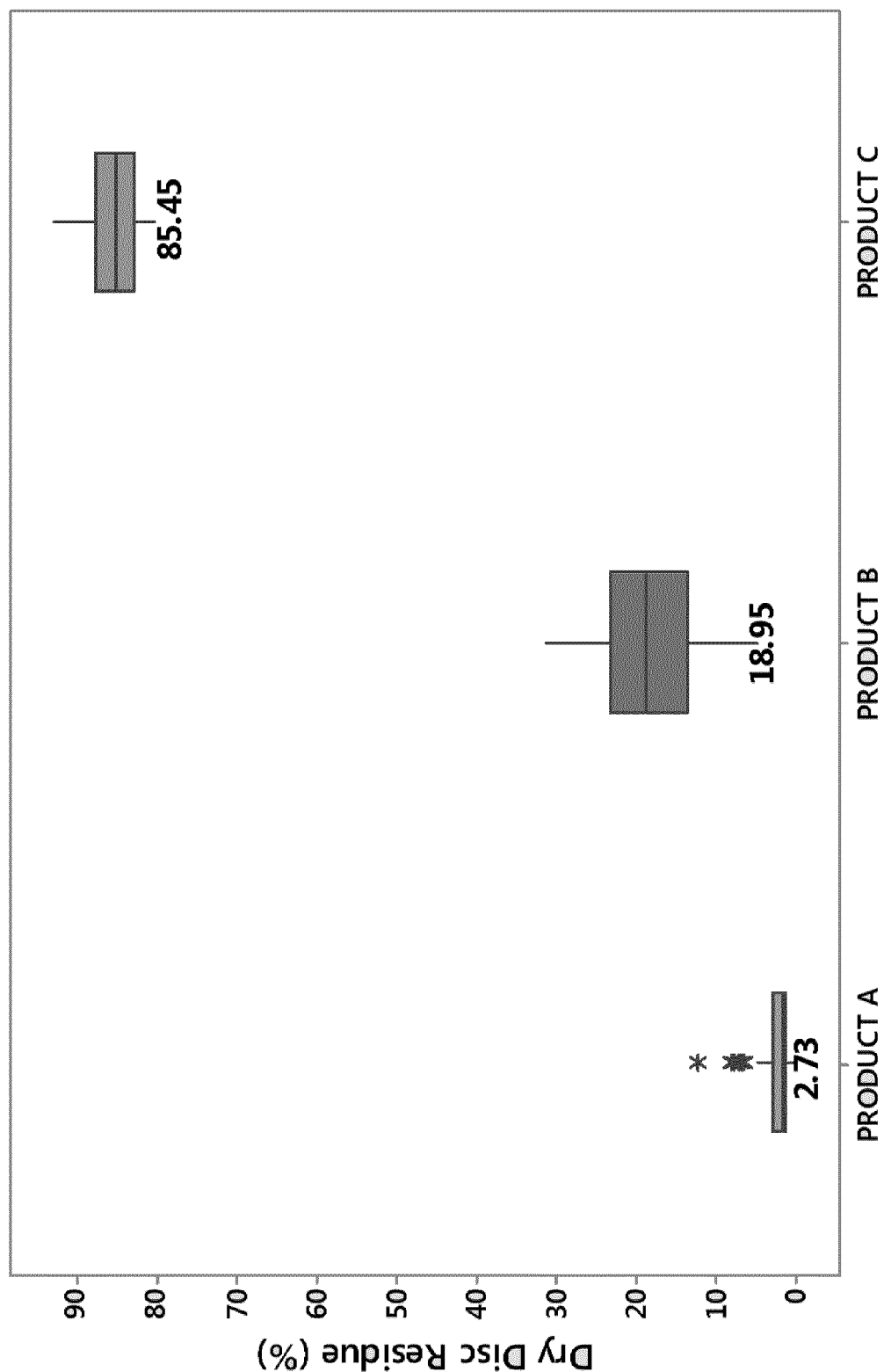
FIG. 4 is a graph comparing the dry residue achieved in Example 1.
Figure 5:
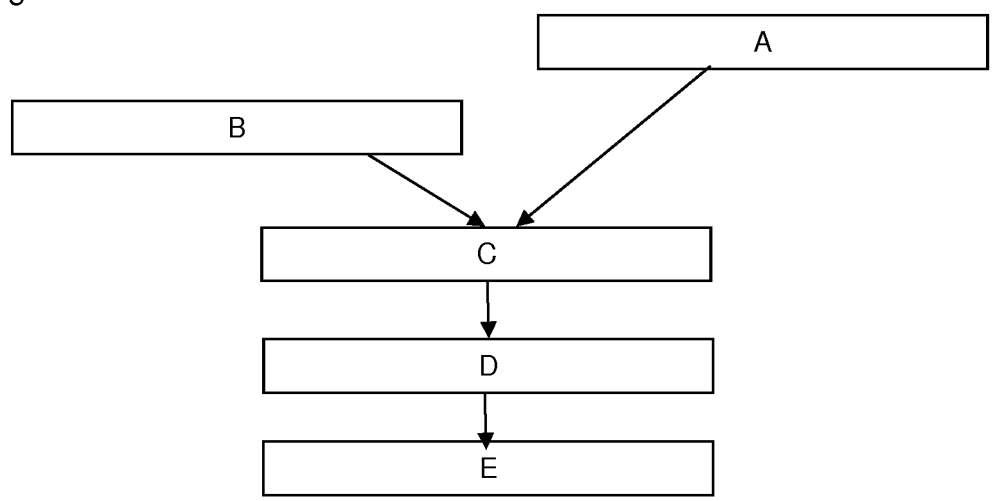
FIG. 5 is a flow chart of the steps in accordance with the method of preparing a dairy powder of the present disclosure.

The impact of additional amorphous sugar can be seen in FIG. 4. Example shown is an average of 25 brews of a T-disc brewed in a Tassimo™ Brewer, using powder produced on the same spray drier under the same conditions. The products were comparable in disc weight and were compared with the same target drink weight.

Product A had 25 wt % sucrose (dry basis) combined into the slurry prior to spray drying, creating a product with 25 wt % amorphous sucrose, and 26 wt % fat (dry basis) with fines recycled by the spray nozzles at the top of the main chamber. Product B had 27.5 wt % sucrose combined into the slurry prior to spray drying creating a product with 27.5 wt % amorphous sucrose and 26% fat (Dry basis) with fines recycled into the external fluidised bed. Product C is a standard whole milk powder (26% fat, dry basis) with 27.5 wt % additional crystalline sucrose dry blended after spray drying.

Comparing Product B and C, which contain equal sucrose, the product with amorphous sucrose in accordance with the method described herein delivers a much lower in disc residue therefore displaying improved solubility within the system (mean of 18.95% vs. 85.46%). Product B also displays a lower fines percentage (vol % of particles below 90 microns) with a mean of 28.6% compared to 48.3%.

Comparing Product A and B, which contain similar levels of sucrose, the product with fines recycled at the top of the drier, by the spray nozzles (product A), delivers a much lower in disc residue therefore displaying improved solubility within the system (mean of 2.73% vs. 18.95%). Product A also displays a lower fines percentage (vol % of particles below 90 microns) with a mean of 19.4% compared to 28.6%.

Example 2

Each of the following samples were introduced in capsules for beverage preparation.

1) Control (0% Sugar)
Rehydrated whole milk powder (WMP) to 30% total solids (TS) (batch 700 Kg): 218 Kg of whole milk powder in 482 Kg of water at room temperature. Spray-dried at 30% Total Solids:

2) 10% Amorphous sucrose at 30% Total Solids:
Rehydrated WMP to 30% TS (batch 600 Kg): 187.5 Kg of whole milk powder in 412.5 Kg of water
Rehydrated sucrose to 30% TS: 60 Kg of sucrose in 140 Kg of water at 40° C.
Added 67 Kg solution of sucrose at 30% TS to 600 Kg of the rehydrated WMP 30% TS to have 10% Sucrose TS. Spray-dried.

3) 25% Amorphous sucrose at 30% Total Solids:
Added 70 Kg solution of sucrose at 30% TS to 300 Kg of rehydrated WMP 30% TS (already containing 10% TS of sucrose) to give 25% sucrose TS. Spray-dried.

4) Control (0% Sugar)
Rehydrated WMP to 40% TS (batch 600 Kg): 249.6 Kg of whole milk powder in 350.5 Kg of water. Spray-dried.

5) 10% Amorphous sucrose at 40% Total Solids:
Rehydrated sucrose to 40% TS: 80 Kg of sucrose in 120 Kg of water at 40° C.
Added 28 Kg of the sucrose solution at 40% TS to 250 Kg of rehydrated WMP at 40% TS to give 10% sucrose TS. Spray-dried.

6) 25% Amorphous lactose at 40% Total Solids:
Rehydrate lactose at 40% TS (batch 200 Kg): 80 Kg of lactose powder in 120 Kg of water at 50° C. at the beginning and rise up to 70° C. to dissolve the crystals
Add 67 Kg solution of lactose at 40% TS to 200 Kg of the rehydrated WMP 40% TS to have a concentration of lactose at 25% TS. Spray-dried.

7) 25% Amorphous sucrose at 40% Total Solids:
Added 67 Kg of a solution of sucrose at 40% TS to 200 Kg of rehydrated WMP at 40% TS to give 25% sucrose TS. Spray-dried.

8) 10% Crystalline sucrose with WMP at 40% Total Solids:
Added 1.1 Kg of crystalline sucrose to 10 kg spray-dried whole milk powder (from 40% total solids) to form a dry-blended powder containing 10% sucrose TS.

| Sample # | Total Solids | Sugar | Residue (wt %) |
| --- | --- | --- | --- |
| 1 | 30% | 0% Sugar | 80 |
| 2 | 30% | 10% amorphous sucrose | 55 |
| 3 | 30% | 25% amorphous sucrose | 16 |
| 4 | 40% | 0% Sugar | 52 |
| 5 | 40% | 10% amorphous sucrose | 20 |
| 7 | 40% | 25% amorphous sucrose | 6 |
| 4 | 40% | 0% Sugar | 52 |
| 8 | 40% | 10% crystalline sucrose | 48 |
| 5 | 40% | 10% amorphous sucrose | 20 |
| 4 | 40% | 0% Sugar | 52 |
| 7 | 40% | 25% amorphous sucrose | 6 |
| 6 | 40% | 25% amorphous lactose | 8 |

As demonstrated by these Examples:
Increasing amorphous sugar levels reduces residues.
Sugar in crystalline form is ineffective (compared to sugar in amorphous form) in reducing residues.
Amorphous sucrose and amorphous lactose are both effective in reducing residues.
Residues (%) was calculated by (weight of dried matter left in capsule after beverage preparation/weight of powder in capsule before beverage preparation)×100%.

Example 3

Each of the following samples were introduced in capsules for beverage preparation.
1) Control (0% Sugar), Whole Milk Powder, 40% Total Solids:
Rehydrate WMP at 40% TS (batch 600 Kg): 249.6 Kg of whole milk powder in 350.5 Kg of water, Spray-drying.
2) 25% Sugar (15% lactose+10% sucrose), starting from Whole Milk Powder;
Adding 10.8 Kg lactose+7.2 Kg of sucrose to 72 Kg of water at 70° C.
Adding 54 Kg of WMP to obtain 50% TS, Spray-drying.
3) 25% Sugar (15% TS lactose+10% TS sucrose), starting from Liquid Milk;
Receive and standardize whole milk liquid around 500 Kg at about 13% TS Pasteurization and evaporation of liquid milk up to 50% TS, (116.5 Kg at 49.6% TS), adding 38.2 Kg of solution of sugar (11.5 kg lactose+ 7.6 kg sucrose+19.1 kg water at 70 C) at 50% TS, homogenization and spray-drying.

| Sample # | Sugar | Residue (wt %) |
|---|---|---|
| 1 | Control: 0% Sugar | 53 |
| 2 | 25% amorphous Sugar (15% lactose, 10% sucrose), from WMP | 5 |
| 3 | 25% amorphous Sugar (15% lactose, 10% sucrose), from liquid milk | 6 |

As demonstrated by these Examples:
Amorphous sugar, including a mixture of sucrose and lactose) is effective in reducing residues.
The starting dairy liquid can be prepared from powder or liquid milk.
All percentages herein are by weight unless otherwise stated.
The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A method for preparing a spray-dried dairy powder for forming a milk beverage when dissolved in a beverage medium, the method comprising:
forming a dairy composition by
adding a sugar composition to a dairy liquid, and
spray-drying the dairy composition to form the spray-dried dairy powder comprising amorphous sugar,
wherein the sugar composition provides from 10 to 40 wt. % sugar by weight of the spray-dried dairy powder and wherein the sugar is selected from sucrose, lactose and a mixture thereof, and
wherein the sugar composition is amorphous sugar.

2. A method according to claim 1, wherein the dairy liquid comprises whole milk or a whole-milk concentrate.

3. The method for preparing a spray-dried dairy powder for forming a milk beverage when dissolved in a beverage medium according to claim 1, the spray-dried dairy powder comprising from 10 to 40 wt. % amorphous sucrose.

4. The method according to claim 3, wherein the spray-dried dairy powder comprises amorphous lactose.

5. The method for preparing a spray-dried dairy powder for forming a milk beverage when dissolved in a beverage medium according to claim 1,
wherein the amorphous sugar comprises up to 40 wt. % amorphous sucrose by weight of the spray-dried dairy powder.

6. The method according to claim 1, comprising from 20 to 30 wt. % amorphous sucrose by weight of the spray-dried dairy powder.

7. The method according to claim 1, wherein the amorphous sugar comprises amorphous lactose.

8. The method according to claim 7, wherein the spray-dried dairy powder is at least partially agglomerated.

9. The method according to claim 7, wherein the amorphous sugar consists of amorphous lactose.

10. The method according to claim 8, wherein the at least partially agglomerated, spray-dried dairy powder has a particle size X50 of from 100 to 200 microns.

11. The method according to claim 10, wherein the spray-dried dairy powder comprises less than 35 v. % of particles having a diameter of 90 microns or less.

12. The method according to claim 11, wherein the spray-dried dairy powder comprises less than 32.5 v. % of particles having a diameter of 90 microns or less.

13. The method according to claim 11, wherein the spray-dried dairy powder comprises less than 30 v. % of particles having a diameter of 90 microns or less.

14. The method according to claim 1, wherein the spray-dried dairy powder comprises from 10 to 40 wt. % amorphous sucrose.

\* \* \* \* \*